Sept. 20, 1960    H. H. WELTMAN    2,953,277
REFUSE RECEPTACLE
Filed Oct. 7, 1958
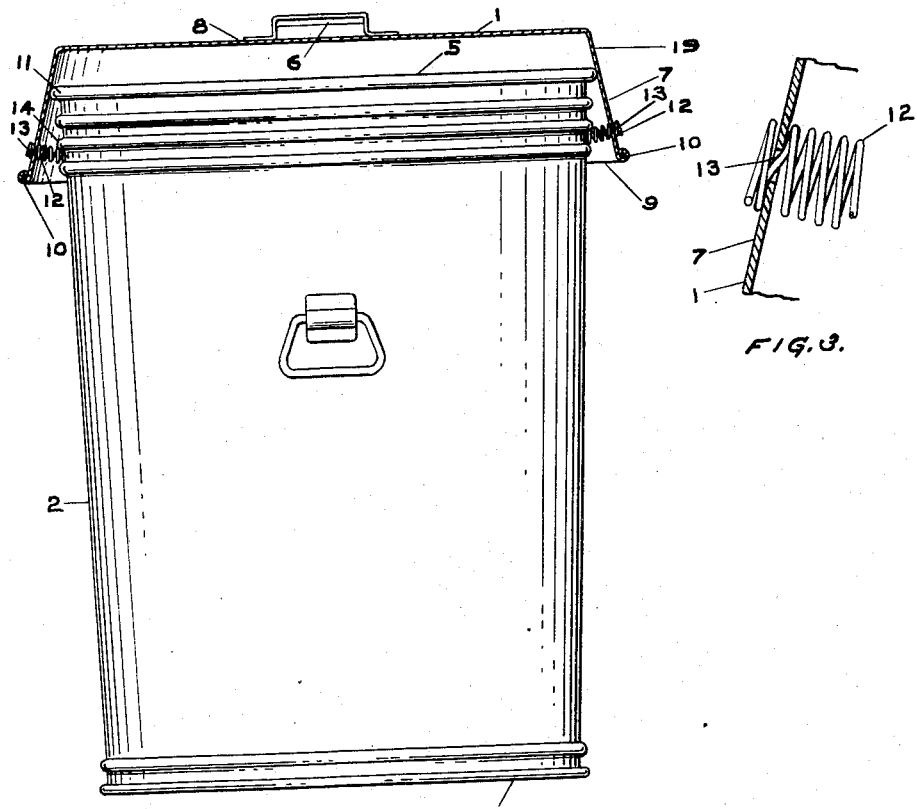
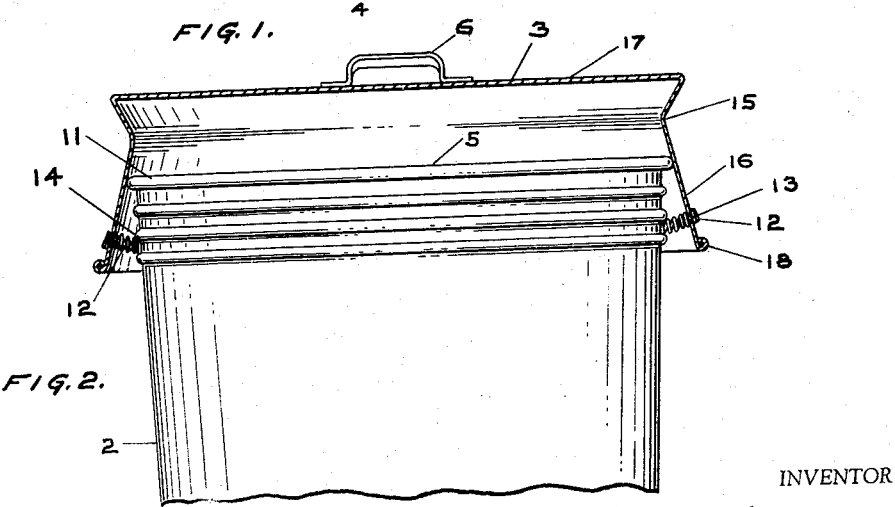
INVENTOR
Harry H. Weltman
BY Leonard J. Kerpelman
ATTORNEY

United States Patent Office 2,953,277
Patented Sept. 20, 1960

2,953,277
REFUSE RECEPTACLE

Harry H. Weltman, 4828 Beaufort Ave., Baltimore, Md., assignor of fifty percent to Leonard J. Kerpelman, Baltimore, Md.

Filed Oct. 7, 1958, Ser. No. 774,795

4 Claims. (Cl. 220—55)

The present invention relates to receptacles, and particularly to lids for receptacles such as are in common use for holding trash, garbage, ashes, or other refuse, and is a continuation-in-part of my application S.N. 718,831 filed March 3, 1958, now abandoned.

A common problem with such refuse containers and lids, particularly the metal type, is that they are subjected to extremely rough use and handling, and as a consequence, after a short period of use, the container, or lid, or both, become so battered and deformed that the lid no longer forms a good fit with the top of the container, with the result that the lid either will not remain in closing position on the container at all, or, else, fits so precariously that it is easily removed by wind, rats, dogs, cats, or other causes, with consequent exposure, spilling, or blowing about of the unhealthful and unsavory materials contained therein, frequently thus causing the householder, or other proprietor of the container, to be in violation of city ordinances against the maintenance of refuse receptacles without tight-fitting lids, or to cause the receptacles to be the source of unneat or unsanitary conditions.

It is an object of this invention to provide an improved refuse receptacle, the lid of which is not so readily permanently mis-fitted by the usual hard use to which such lids are subjected, and which, even if the lid, or the container for which it is provided, is deformed substantially, will still fit substantially well.

Another object of this invention is the provision of a refuse container lid which is easily placed on, or removed from, its associated container, even when such lid or container has become deformed in use from its original shape.

Another object of this invention is the provision of a refuse container lid having a depending, deformable, flaring skirt, which skirt forms the closure with the associated container, the said skirt having a very large inherent amount of tolerance of fit, so that the lid will still form a good closure with the container after much hard use, and the flexing or deforming ability of the skirt will serve to assure a good friction fit when the lid is given a slight push into seated position on even a battered or badly out-of-round can.

Another object of this invention is the provision of a simple, inexpensive, holding latch in the form of a spring attached to the lid flange to give a positive holding action for my new form of lid, with very little additional manufacturing expense.

Another object is the provision of a refuse container lid having the aforementioned advantages entirely inherent in its novel shape, and which, except for the aforesaid latch, which is not essential to its functioning, does not depend on complex or fallible mechanical attachments to accomplish its purposes.

Other objects and advantages of the invention will be apparent from the following description, and accompanying drawings, in which similar reference characters indicate similar parts throughout the several views.

Figure 1 is an elevational view in vertical cross-section of my invention.

Figure 2 is a modified form of my invention, also shown as an elevational view in vertical cross section.

Figure 3 is a detail view of a fragmentary portion of my lid showing how the latching spring is attached.

In the cross-sectional view of Figure 1, my improved refuse receptacle lid 1 is shown in position of use on a conventional refuse container 2. Container 2 may be of plastic or metal, and preferably is made in slightly tapered, cylindrical form so that the bottom 4 of the container is of a slightly smaller diameter than the upper open end 5, with the result that the container may be nested with similar containers for shipment. The container, if of metal, as shown in the preferred form of Fig. 1, is usually made with a wired edge 11, which defines the upper opening of the container 2.

Receptacle lid 1 may have a handle 6 which is either rigid, as shown, or which may be of the swiveled type which will lie flat.

My receptacle lid 1 is made with a round body portion 8, to which handle 6 is attached, and a relatively wide, depending tapered, or flared, flange 7, which is the most essential feature of my invention. The flange has a flexible or deformable flange wall 19 having a lower lip 9, which is preferably the lower extremity of a wired edge 10, said wired edge 10 greatly increasing the strength and durability of the lid 1. The lid may, of course, also be made with annular or vertical corrugations, to increase its strength and rigidity, and need not necessarily have a flat disc-shaped body portion, but may also have, for example, a dome-shaped body portion which gradually merges into the depending flared flange 7.

The diameter of lower lip 9 of flange 7 is substantially greater than the diameter of the open end 5 of container 2, and the outer diameter of body portion 8 of lid 1 is smaller than the diameter of open end 5, with the result that when lid 1 is in a position of use on container 2, an intermediate portion of flange wall 19, that is, an annular portion of flange wall 19 intermediate between wired edge 10 and body portion 8, rests upon open end 5.

It is important to note that, under ordinary conditions of use, as upon a can which is out-of-round, or bent, the flange 7 will ordinarily contact the open end 5 of the container 2 at only two points when first placed in position. However, when a slight push on lid 1 is then applied by the user, the entire depending flange 7 will deflect, or deform slightly, and take the general shape of the open end 5 of the can 2. A slight additional push or pressure by the user will then form a good friction fit around a substantial proportion of the circumference of open end 5 and of flange 7.

I have found in practice that the guage of metal ordinarily used in refuse container lids will readily allow this necessary flexing or deformation without requiring undue effort on the part of the user of the device.

It will also be noted that if either container 2 or lid 1 should become battered or deformed, there is sufficient clearance between lip 9 and the walls of the container so that unless the deformation has been extreme, lid 1 will still make a substantially contents-tight closure with container 2.

By way of example, it has been found that with a conventional twenty-gallon metal container having an open end 5 of 17-inch diameter, a lid 1 with body portion 8 of 16½ inch diameter and lower lip 9 of 18½ inch diameter, and with flange 7 4 inches wide, proved very satisfactory in use in that lid 1 would still fit container 2 after both had been subjected to a great deal of use and deformation.

Lid 1 may also have one or more helical spring members 12 threaded into small holes 13. It has been found in use that one spring alone will satisfactorily perform the function desired. That function is to act as a latch which will hold lid 1 to container 2 with a positive latching action in conjunction with wired edge 11, and in conjunction with frictional abutment of the spring against the outer wall of container 2. Thus, when lid 1 is placed upon container 2, springs 12 will flex and deform so as to pass over wired edge 11 and any annular corrugations 14 which may be present. Thus, by frictional and mechanical engagement of springs 12 with the container body and/or the container wired edge 11, or corrugations 14, accidental lifting of lid 1 by the wind, or undesired lifting by animals is resisted. At the same time springs 12 will flex easily enough to allow removal of the can lid with one hand.

The attachment of springs 12 by threading into a bore 13 of suitable size is so simple and inexpensive that very little is added to the cost of manufacture of refuse container lids having this feature.

In the modification shown in Fig. 2, my refuse container lid 3 is made with an annular pinched-in section 15, in depending flange 16, instead of with the straight cross-section taper 7 of Fig. 1. It has been found in practice that such a modification gives a somewhat tighter fit and it is not desired to limit my invention to the straight taper of Fig. 1. In this modification, the diameter of pinched-in annular section 15 is less than the diameter of open end 5 of container 2, while the diameter of lower lip 18 of flange 16, is larger than the diameter of open end 5. Thus, when lid 3 is placed in closing position on container 2, open end 5 seats against flange 16 intermediate between pinched-in section 15 and lower lip 18. Flange 7 could, of course, have a shape other than that illustrated in either Fig. 1 or Fig. 2, as long as it is some form of flaring, flexing, depending flange.

What I claim is:

1. A trash or refuse receptacle including a trash or refuse container having a side wall portion, a closed end, and an open end, said open end being defined by a substantially circular bead; and a lid, said lid comprising a body portion and a flaring, generally frustro-conical deformable flange, depending from said body portion, said flange having a substantial slope in an intersecting direction with respect to said bead when said lid is emplaced in closing relationship on said container, and said flange having an upper diameter smaller than the diameter of said bead, and a lowermost diameter substantially greater than the diameter of said bead, whereby when said lid is placed on said container, and hand forced so as to flex said deformable flange, the flange bears upon said bead and makes line contact therewith circumferentially of said bead.

2. The device of claim 1 in which the flange has at least one relatively stiff spring attached thereto, said spring protruding transversely from said flange in the direction of the associated container, whereby said spring serves as a deformable latch to aid in holding the lid in position on the container.

3. The device of claim 2 in which the spring is a helical spring.

4. The device of claim 3 in which the helical spring is inserted in a transverse bore in the wall of the flange of appropriate size.

References Cited in the file of this patent

UNITED STATES PATENTS

| | | |
|---|---|---|
| 665,618 | Scott | Jan. 8, 1901 |
| 1,129,222 | Nylund | Feb. 23, 1915 |
| 1,141,625 | Gardner | June 1, 1915 |
| 1,527,383 | Solliday | Feb. 24, 1925 |
| 1,598,612 | Kraft | Sept. 7, 1926 |
| 1,973,449 | Tighe | Sept. 11, 1934 |

FOREIGN PATENTS

| | | |
|---|---|---|
| 167,423 | Great Britain | Aug. 11, 1921 |